US008074871B2

(12) United States Patent
Bates

(10) Patent No.: US 8,074,871 B2
(45) Date of Patent: Dec. 13, 2011

(54) METHODS AND SYSTEMS FOR VALIDATING NEGOTIABLE INSTRUMENTS

(75) Inventor: Michael R. Bates, Fountain Hills, AZ (US)

(73) Assignee: Certegy Check Services, Inc., Jacksonville, FL (US)

( * ) Notice: Subject to any disclaimer, the term of this patent is extended or adjusted under 35 U.S.C. 154(b) by 1266 days.

(21) Appl. No.: 11/520,430

(22) Filed: Sep. 13, 2006

(65) Prior Publication Data
US 2007/0205262 A1 Sep. 6, 2007

Related U.S. Application Data

(60) Provisional application No. 60/718,124, filed on Sep. 16, 2005.

(51) Int. Cl.
G07F 19/00 (2006.01)
G06F 17/00 (2006.01)
G06Q 40/00 (2006.01)

(52) U.S. Cl. ............. 235/379; 235/375; 705/35; 705/45

(58) Field of Classification Search .................. 235/375, 235/379, 383; 705/14, 16, 44, 35, 39, 45; 382/137
See application file for complete search history.

(56) References Cited

U.S. PATENT DOCUMENTS

| 4,685,141 | A | | 8/1987 | Hoque et al. | |
|---|---|---|---|---|---|
| 4,813,077 | A | | 3/1989 | Woods et al. | |
| 5,146,512 | A | * | 9/1992 | Weideman et al. | 382/218 |
| 5,193,121 | A | | 3/1993 | Elischer et al. | |
| 5,321,238 | A | | 6/1994 | Kamata et al. | |
| 5,359,667 | A | | 10/1994 | Borowski et al. | |
| 5,894,525 | A | | 4/1999 | Nohl et al. | |
| 5,897,625 | A | | 4/1999 | Gustin et al. | |
| 6,073,121 | A | * | 6/2000 | Ramzy | 705/45 |
| 6,668,074 | B1 | | 12/2003 | Wilson | |
| 6,808,109 | B2 | * | 10/2004 | Page | 235/379 |
| 6,816,608 | B2 | | 11/2004 | Cato | |
| 7,267,264 | B2 | * | 9/2007 | Page | 235/379 |
| 7,461,775 | B2 | * | 12/2008 | Swift et al. | 235/379 |
| 7,475,807 | B2 | * | 1/2009 | Halpin et al. | 235/378 |
| 7,494,052 | B1 | * | 2/2009 | Carpenter et al. | 235/379 |

(Continued)

FOREIGN PATENT DOCUMENTS
EP  344742 A2  * 12/1989

OTHER PUBLICATIONS

IT Web Limited; "Unisys, ATS Money Systems team up to sell Windows NT-based check processing solutions for retail and financial markets" [online]; Oct. 20, 1998; [retrieved on Aug. 7, 2006]; Retrieved from the Internet <http://www.itweb.co.za/office/unisys/9810201251.htm>; pp. 1-2.

*Primary Examiner* — Thien M. Le
*Assistant Examiner* — April Taylor
(74) *Attorney, Agent, or Firm* — Finnegan, Henderson, Farabow, Garrett & Dunner, L.L.P.

(57) ABSTRACT

Methods and systems for validating a negotiable instrument. One method can include obtaining an electronic image of the negotiable instrument, electronically determining a first value and a second value of the negotiable instrument based on the electronic image, and automatically validating the negotiable instrument if the first value is substantially equal to the second value.

8 Claims, 3 Drawing Sheets

U.S. PATENT DOCUMENTS

| | | | |
|---|---|---|---|
| 7,653,600 B2 * | 1/2010 | Gustin et al. | 705/43 |
| 7,690,561 B1 * | 4/2010 | Blackson et al. | 235/379 |
| 7,721,949 B2 * | 5/2010 | VanKirk et al. | 235/379 |
| 2002/0152164 A1 | 10/2002 | Dutta et al. | |
| 2002/0152170 A1 | 10/2002 | Dutta et al. | |
| 2003/0050892 A1 | 3/2003 | Clynes et al. | |
| 2003/0093368 A1 | 5/2003 | Manfre et al. | |
| 2004/0181485 A1 * | 9/2004 | Finch et al. | 705/45 |
| 2005/0091114 A1 | 4/2005 | Phillips et al. | |
| 2005/0091132 A1 | 4/2005 | Phillips et al. | |
| 2005/0097019 A1 | 5/2005 | Jacobs | |
| 2005/0108168 A1 | 5/2005 | Halpin et al. | |
| 2005/0131820 A1 | 6/2005 | Rodriguez et al. | |
| 2006/0112013 A1 * | 5/2006 | Maloney | 705/45 |
| 2007/0045930 A1 * | 3/2007 | Hayduchok et al. | 271/2 |
| 2007/0215692 A1 * | 9/2007 | VanKirk et al. | 235/379 |
| 2009/0171800 A1 * | 7/2009 | Phillips et al. | 705/21 |

* cited by examiner

METHODS AND SYSTEMS FOR VALIDATING NEGOTIABLE INSTRUMENTS

RELATED APPLICATIONS

The present patent application claims priority to U.S. Provisional Patent Application Ser. No. 60/718,124 filed on Sep. 16, 2005, the entire content of which is herein incorporated by reference.

BACKGROUND OF THE INVENTION

Negotiable instruments, such as checks, are often used as a form of payment. In some situations, checks provided as payment are imaged and processed in order to complete a transaction. For example, handwritten information included in a check is electronically analyzed (e.g., using optical character recognition) in order to identify information about the check, such as an amount of the check. If, however, errors occur when information is identified in a check, the check may not be deposited or processed correctly. For example, if a handwritten "7" on a check is identified as a "1" during optical character recognition or if an optical character recognition application cannot read the long-hand dollar amount in the legal amount received ("LAR") field of a check, the check may be processed incorrectly.

In remittance processing environments, also known as lockbox environments, a payment stub that accompanies a check payment can be used as a validation point to ensure a correct identification or reading of information from the check, such as the check amount. The payment stub can also be used to automate processing of the check payment and reduce human intervention during the processing procedure.

In some situations, however, a payment is not accompanied with a payment stub or another document specifying payment details, and a payment receiver is forced to use only the handwritten data on a check to process the check. As previously noted, electronically identifying handwritten data included in a check can introduce errors and can increase the need for manual review and correction.

Additionally, payment receivers are often not readily informed as to whether a check that was accepted by the payment receiver was processed properly such that the payment receiver received the promised funds. If a check accepted by a payment receiver cannot be processed properly (e.g., the check is written for an incorrect amount or the check was not authorized correctly), the check is often referred to as a non-compliant item. Currently, the only ways for a payment receiver to determine and/or identify non-compliant items is to either manually match checks to transactions processed by the payment receiver (e.g., reviewing transactions managed by a point of sale ("POS") system of the payment receiver) or to wait for non-compliant checks to be returned (e.g., from a financial institution). Each of these ways can be time-consuming and can delay the processing of a check.

Furthermore, check processing typically includes multiple manual operations. For example, checks presented at one or more POS devices are collected by an individual. The individual must then order the checks according to their receipt at a POS device and arrange the checks so that each check is positioned in the same orientation. In most situations, an individual (e.g., a store manager) routinely collects the checks and brings the checks to a secure area for further processing. Once the checks have been manually processed, they are stored until ready for further processing. When the process is to continue, the batch of checks is submitted to a document processing machine that images the checks.

EMBODIMENTS OF THE INVENTION

Embodiments of the invention provide methods for validating a negotiable instrument. One method can include obtaining an electronic image of the negotiable instrument, electronically determining a first value and a second value of the negotiable instrument based on the electronic image, and automatically validating the negotiable instrument if the first value is substantially equal to the second value.

Additional embodiments provide system for validating a negotiable instrument. One system can include a point of sale system for receiving the plurality of negotiable instruments and authorizing a transaction amount for each of the plurality of negotiable instruments, an imaging system for generating an electronic image of each of the plurality of negotiable instruments and automatically positioning each of the plurality of negotiable instruments in substantially the same orientation, and a processing system for determining at least one value of each of the plurality of negotiable instruments based on the electronic image of each of the plurality of negotiable instruments and determining whether to validate each of the plurality of negotiable instruments based on at least one of the at least one value and the transaction amount associated with each of the plurality of negotiable instruments.

Further embodiments also provide computer readable mediums including instructions for validating a negotiable instrument. One computer readable medium can include instructions for obtaining an electronic image of each of the plurality of negotiable instruments, determining at least one value of each of the plurality of negotiable instruments based on the electronic image of each of the plurality of negotiable instruments, validating each of the plurality of negotiable instruments based on the at least one value of each of the plurality of negotiable instruments, depositing the plurality of negotiable instruments, determining a deposited total of the plurality of negotiable instruments, obtaining an expected total of the plurality of negotiable instruments, and determining a difference between the deposited total of the plurality of negotiable instruments and the expected value of the plurality of negotiable instruments.

DETAILED DESCRIPTION

Figure 1:
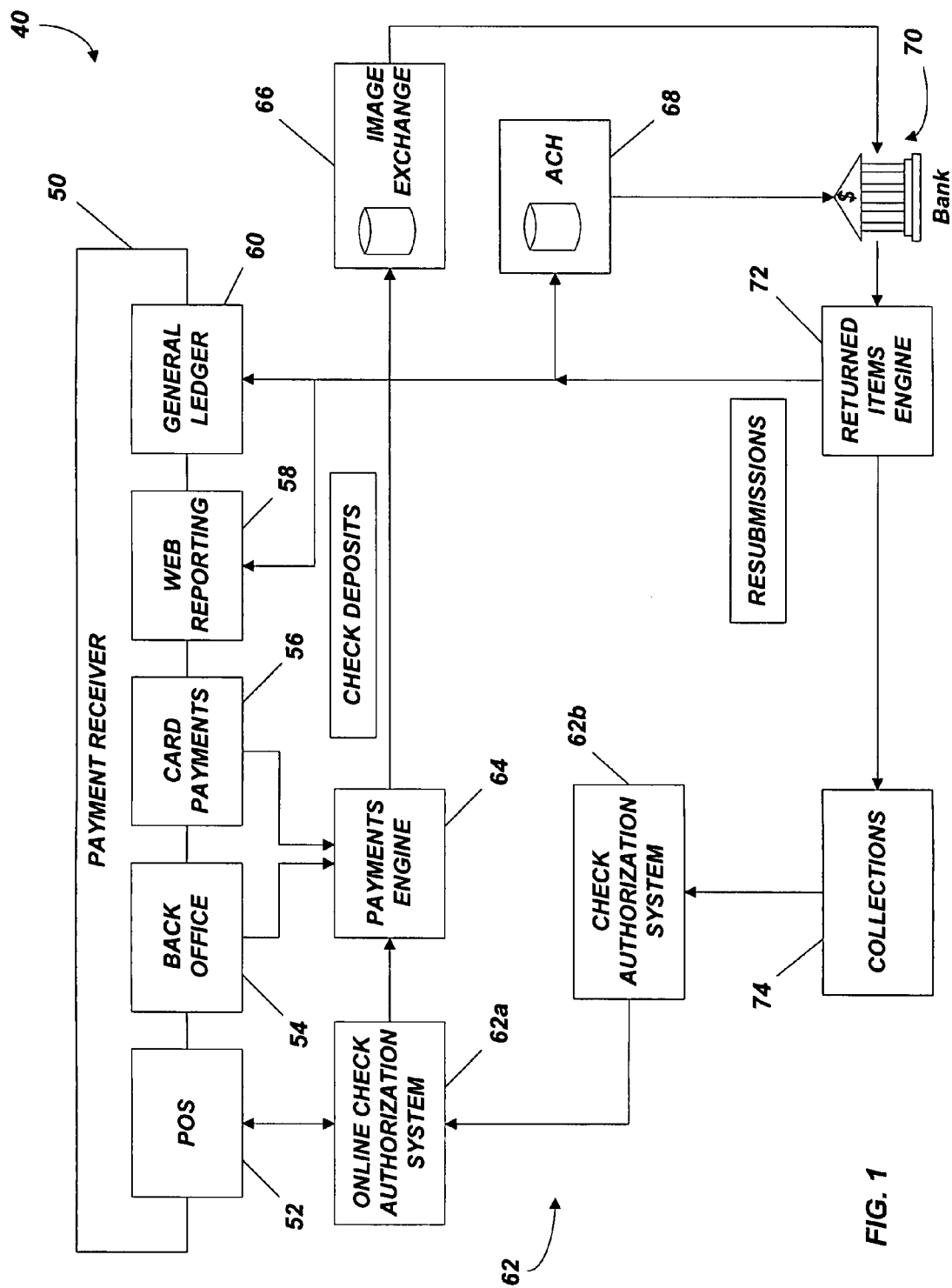
FIG. 1 illustrates a system for validating a negotiable instrument according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items.

The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

In addition, it should be understood that embodiments of the invention can include both hardware and electronic components or modules that, for purposes of discussion, can be illustrated and described as if the majority of the components were implemented solely in hardware. However, one of ordinary skill in the art, and based on a reading of this detailed description, would recognize that, in at least one embodiment, the electronic based aspects of the invention can be implemented in software. As such, it should be noted that a plurality of hardware and software based devices, as well as a plurality of different structural components can be utilized to implement the invention. Furthermore, and as described in subsequent paragraphs, the specific configurations illustrated in the drawings are intended to exemplify embodiments of the invention and that other alternative configurations are possible.

FIG. 1 illustrates a system 40 for validating negotiable instruments according to one embodiment of the invention. In some embodiments, the system 40 can validate multiple types of negotiable instruments, such as checks (e.g., personal checks, business checks, traveler's checks, social services checks, government checks, etc.), promissory notes, and/or bills of exchange. As shown in FIG. 1, the system 40 can include a merchant or lockbox ("payment receiver") system 50. The payment receiver system 50 can include one or more systems and/or devices, such as a POS device or system 52, a back office system 54, a card payments system 56, a web reporting system 58, and a general ledger system 60. It should be understood that the payment receiver system 50 shown in FIG. 1 is an exemplary system and, in some embodiments, can include fewer or additional systems. Systems included in the payment receiver system 50 can also be combined and/or distributed differently than as shown in FIG. 1.

A payment receiver can receive a negotiable instrument, such as a check, as a payment at the POS system 52 and the POS system 52 can attempt to authorize the check. In some embodiments, the POS system 52 can access or interface with a check authorization system 62, such as SCAN$^{SM}$ provided by eFunds Corporation, in order to authorize a check. For example, the POS system 52 can provide details of a check presented as a payment and, in some embodiments, details of the transaction that that the check as been presented as a payment for to (e.g., transaction amount, transaction description, etc.). It should be understood that the check authorization system 62 can be incorporated within the POS system 52.

In some embodiments, the POS system 52 can verify the check by comparing details of the check (e.g., the check signer's driver's license number or account number) to a file or list of driver's license numbers and/or account numbers associated with known bad check writers. For example, the POS system 52 can obtain a file or list of known bad check writers from the check authorization system 62. In some embodiments, the POS system 52 can obtain an updated file or list of known bad check writers from the check authorization system in approximately real-time for each check presented to the POS system 52. In other embodiments, the POS system 52 can obtain the file or list from the check authorization system 62 on a predetermined schedule (e.g., once a day, once a month, etc.) or whenever the check authorization system 62 makes an updated file or list available. The file of known bad check writers and/or accounts can include individuals who currently have an unpaid returned check owed to one or more payment receivers (e.g., one or more payment receivers within a particular network associated with the check authorization system 62). In some embodiments, to establish the file of known bad check writers and/or accounts, the check authorization system 62 can receive information about returned checks from payment receivers and/or other individuals associated with the check authorization system 62. The check authorization system 62 can merge the received information and can provide a file of returned check activity that is accessible by payment receivers. In some embodiments, the check authorization system 62 can update the file of returned check activity whenever the system 62 receives new information and/or on a predetermined schedule (e.g., daily). The payment receiver (e.g., via the POS system 52) can review the information provided by the check authorization system 62 in order to determine whether to accept or reject a check payment.

In some embodiments, the check authorization system 62 also provides referral value to payment receivers who have unpaid checks from consumers. For example, if a consumer is rejected by a first payment receiver because the check authorization system 62 informs the first payment receiver that the consumer wrote a bad check to a second payment receiver, the check authorization system 62 can provide information that the first payment receiver can pass along to the consumer. The information passed on to the consumer can include an identification of the second payment receiver to whom the customer wrote a back check to. The information passed on to the consumer can also include instructions to the consumer that they must pay owed checks before they will be removed from the file of bad check writers and have their check writing privileges restored.

As shown in FIG. 1, in some embodiments, the check authorization system 62 can include an online check authorization system 62a, such as SCAN Online$^{SM}$ provided by eFunds Corporation and an off-line check authorization system 62b, such as SCAN$^{SM}$ provided by eFunds Corporation. The online check authorization system 62a can include a web-based application that a payment receiver (e.g., via the POS system 52) can access via a network, such as the Internet. The online check authorization system 62a can analyze a negotiable instrument received by the POS system 52 and can determine, in approximately real-time, a response. The response determined by the online authorization system 62a can include "Accept," "Decline," "Refer to Manager," etc. In some embodiments, a payment receiver can also use the online check authorization system 62a to customize and design risk management strategies and analytics for authorizing or accepting checks. For example, in some embodiments, all negotiable instrument payments received by the POS system 52 can be switched to and authorized by the online check authorization system 62a. In other embodiments, only certain negotiable instrument payments can be switched to and authorized by the online check authorization system 62a (e.g., based on criteria specified by a payment receiver).

As shown in FIG. 1, in some embodiments, the off-line check authorization system 62b can feed information into the online check authorization system 62a. The information can include information received from payment receivers regarding bad payments, a file of known bad check writers, and/or other data and/or statistics associated with check payment acceptance. The online check authorization system 62a can use the information received from the off-line check authorization system 62b and analytics established for a particular payment receiver in order to determine a response for a negotiable instrument payment received by the payment receiver.

In some embodiments, the off-line check authorization system 62*b* and the online check authorization system 62*a* can be embodied as a single system 62. Modules of the check authorization system 62 can also be installed within the POS system 52 and/or other systems managed by the payment receiver. The off-line check authorization 62*b* and/or the online check authorization system 62*a* can also access other check authorization systems or applications, such as a scored negative file and/or information provided by the Office of Foreign Assets Control ("OFAC").

If the POS system 52 authorizes a check payment (e.g., via the check authorization system 62), the POS system 52 can forward the check payment to a processing system. In some embodiments, the processing system can include the check authorization system 62 and/or the back office system 54 for processing. It should be understood that the POS system 52 can access a different check authorization system 62 to process authorized check payments than the check authorization system 62 previously accessed by the POS system 52 to authorize the check payments. In other embodiments, the POS system 52 can access the same check authorization system 26 used to initially authorize the check, such as SCAN$^{SM}$ or SCAN Online$^{SM}$ provided by eFunds Corporation, in order to process a check payment. The check authorization system 62 that processes authorized check payments can include a system or application managed by the payment receiver and/or a system or application managed by a third-party organization.

In some embodiments, upon receiving an authorized check from the POS system 52, the check authorization system 62 and/or the back office system 54 can image the check. In other embodiments, the POS system 52 can image received checks and can forward the resulting check images to the check authorization system 62 and/or the back office system 54. Intermediary imaging systems or applications can also image check payments before check payments are passed to the check authorization system 62 and/or the back office system 54.

Figure 2:
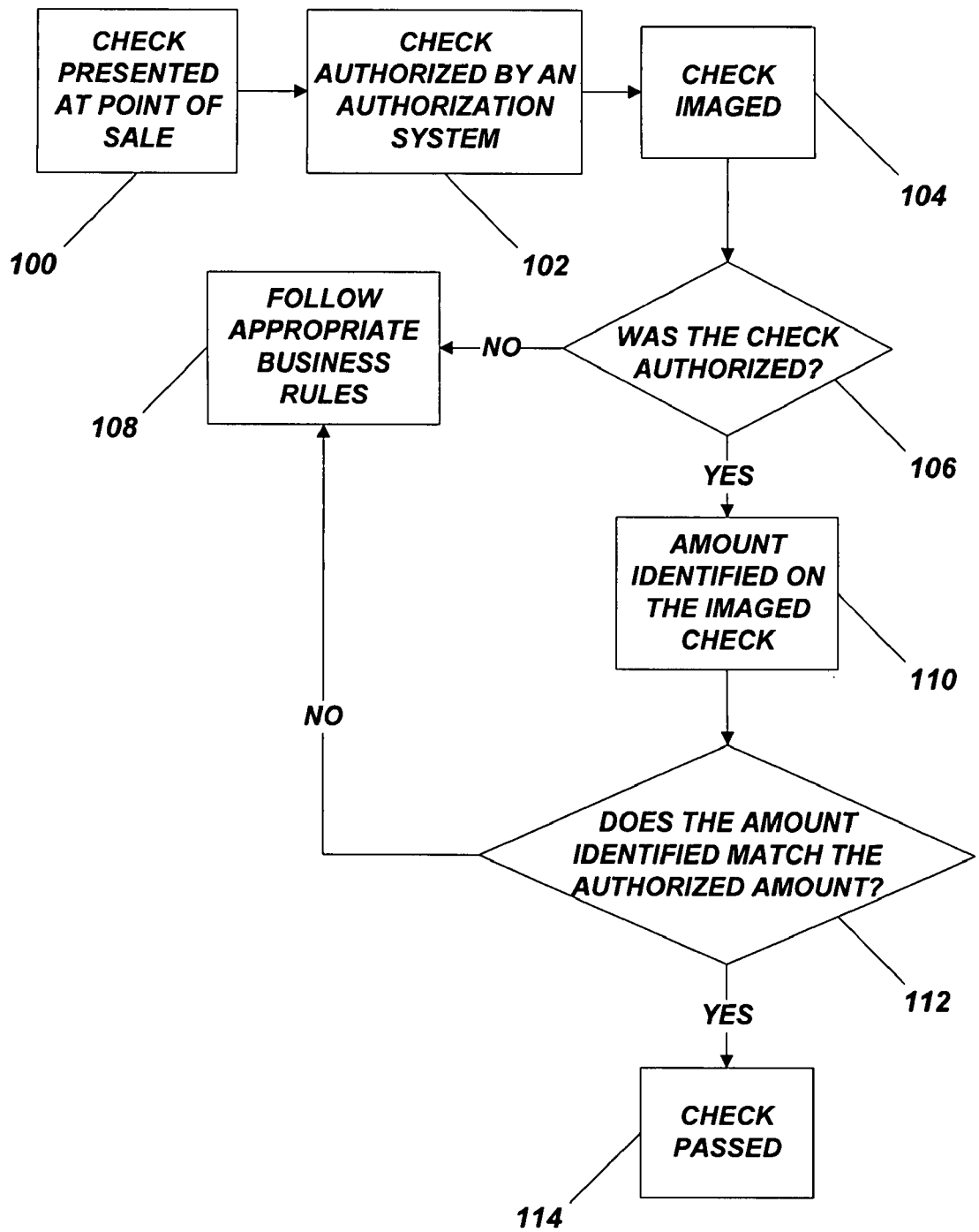
FIG. 2 illustrates a method of validating a negotiable instrument according to one embodiment of the invention.

To validate received checks, the check authorization system 62 and/or the back office system 54 can forward check payments received from the POS system 52 to the payments engine 64. FIG. 2 illustrates a method of validating a negotiable instrument according to one embodiment of the invention. As shown in FIG. 2, the POS system 52 receives a check presented as payment (step 100). Next, the POS system 52 authorizes the check (e.g., via the check authorization system 62), as described above (step 102).

After a check is authorized, the check is presented to the check authorization system 62 and/or the back office system 54. As previously noted, the check received by the check authorization system 62 and/or the back office system 54 can be imaged (e.g., by the POS system 52 and/or another system or application). In some embodiments, the check authorization system 62 and/or the back office system 54 can also image a check (step 104).

To process the check, the check authorization system 62 and/or the back office system 54 forwards the check to the payments engine 64. In some embodiments, rather than requiring an individual to manually organize presented checks (e.g., ordering and orientating checks), the payments engine 64 can automatically organize (e.g., order and orientate) checks when imaging the checks or after the checks have been imaged. For example, the payments engine 64 can order the check images based on their receipt at the POS system 52 and/or can position each check in the same orientation. Automatically organizing the checks can reduce the amount of manual worked required to process a check.

As shown in FIG. 2, when the payments engine 64 receives a check, the payments engine 64 can determine if the check was previously authorized (e.g., by querying the check authorization system 62) (step 106). If the check was not authorized, the payments engine 64 can follow appropriate business rules (step 108). In some embodiments, the payments engine 64 can be configured to automatically reject a check that was not previously authorized.

If a check received by the payments engine 64 was previously authorized by the check authorization system 62, the payments engine 64 identifies the amount of the imaged check (step 110). For example, the payments engine 64 can use optical character recognition or similar recognition technology to determine the Convenience Amount Received ("CAR") of the check (i.e., the amount of the check specified in numbers) and/or the Legal Amount Received ("LAR") of the check (i.e., the amount of the check specified in letters or text).

As shown in FIG. 2, after determining the CAR and/or the LAR of a received check, the payments engine 64 can compare the determined CAR and/or LAR of the check to the amount of the transaction associated with the check that was previously authorized by the check authorization system 62 (step 112). In some embodiments, the payments engine 64 can request the transaction amount associated with a particular check from the POS system 52 and/or the check authorization system 62 that authorized the check payment. In other embodiments, the POS system 52 can provide the transaction amount associated with a check to the check authorization system 62 and/or the back office system 54 when the POS system 52 forwards the check for processing and the check authorization system 62 and/or the back office system 54 may forward the authorized transaction amount to the payments engine 64 when it forwards the check for processing.

If the amounts identified by the payments engine 64 from the check match the transaction amount authorized by the POS system 52, the payments engine 64 validates the check (step 114). As shown in FIG. 1, after validating the check, the payments engine 64 can forward the check payments for deposit. For example, the payments engine 64 can transmit validated checks to an image exchange system 66 and/or an automated clearing house ("ACH") 68. In some embodiments, the payments engine 64 can determine a proper processing route for a particular check payment (e.g., based on the details of the check payment).

The image exchange system 66 and/or the ACH 68 can process the check in order to transfer funds from an account associated with the check to an account of the payment receiver (e.g., via one or more financial institutions 70). If when processed (e.g., by the image exchange system 66, the ACH 65, and/or one or more financial institutions 70), the check turns out to be a non-compliant item (e.g., the account associated with the check has non-sufficient funds or is closed, etc.), the check can be transferred to a returned items engine 72 (e.g., via the financial institution 70 processing the check). The returned items engine 72 can work with a collections organization or system 74 in order to obtain a payment for a returned item. In some embodiments, as shown in FIG. 1, the collections 74 can access, interface, and/or provide information to the check authorization system 62. The information can include returned item information and/or successful payment information (e.g., when the collections system 74 successfully receives payment from a consumer for a returned item). The check authorization system 62 can use information provided by the collections system 74 to build the file or list of known bad check writers and/or remove a check writer from a previously generated file or list. In some embodiments, the financial institution 70 and/or the returned items engine 72 can access, interface, and/or provide information to the check authorization system 62. As shown in FIG. 1, the returned items engine 72 can also resubmit returned items to the image exchange system 66 and/or the ACH 68. In some embodiments, the returned items engine 72 can resubmit returned items in order to determine whether funds that were previously unavailable are now available in an account associated with a returned item.

As shown in FIG. 2, if one or both of the amounts identified by the payments engine 64 from the check (e.g., the LAR and/or the CAR) do not match the amount authorized by the POS system 52, the payments engine 64 can follow appropriate business rules (step 108). For example, the payments engine 64 can flag the check for further review (e.g., human review) and/or can automatically reject the check.

In some embodiments, by comparing the CAR and/or the LAR to the transaction amount authorized by the POS system 52, the payments engine 64 can reduce the error rate of processed checks and, therefore, can reduce human intervention required to process a check. The payments engine 64 can validate the CAR and/or the LAR based on the authorized transaction amount in order to provide an automatic decision as to whether to continue processing the check (e.g., preparing the check for deposit) or queuing the check for human review. In some embodiments, a payment receiver can set parameters that specify how the payments engine 64 should process a check having a CAR or a LAR that does not match the authorized transaction amount. For example, a payment receiver can set parameters that instruct the payments engine 64 to validate a check if at least the CAR of the check and the authorized transaction match. Similarly, a payment receiver can set parameters that instruct the payments engine 64 to queue a check for review if the CAR and the LAR of the check match but are different than the authorized transaction amount.

By validating a check using the process shown in FIG. 2, the payments engine 64 can also provide substantially immediate feedback to a payment receiver as to whether a check that was authorized and accepted was ultimately validated and forwarded for processing. The feedback can be used by a payment receiver to identify potential customer or employee fraud and identify potential opportunities to re-train employees that accept checks inappropriately (e.g., accepted a check with a LAR or a CAR that didn't match the authorized transaction amount).

Figure 3:
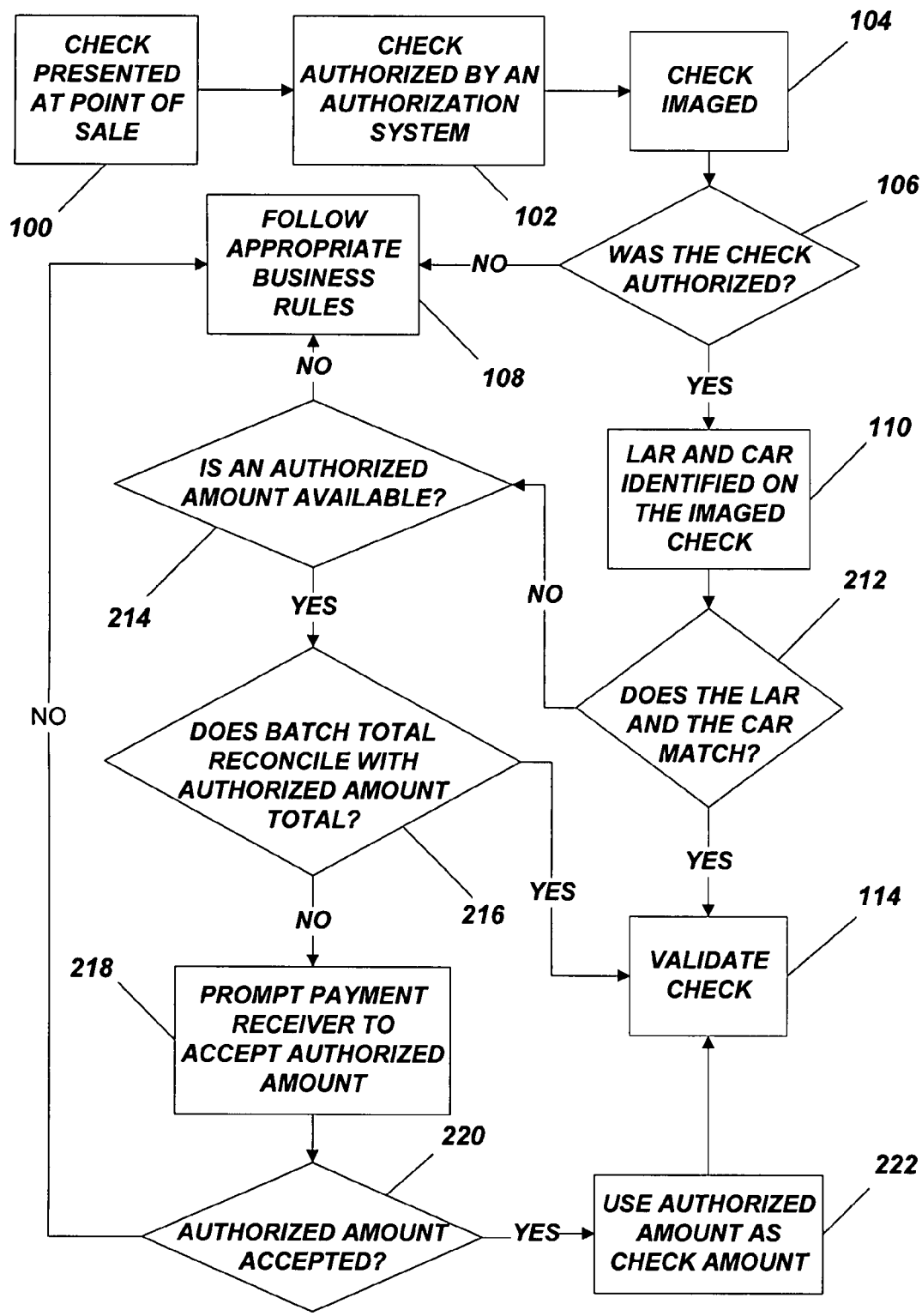
FIG. 3 illustrates another method of validating a negotiable instrument according to one embodiment of the invention.

FIG. 3 illustrates another method of validating a negotiable instrument according to one embodiment of the invention. As shown in FIG. 3, rather than immediately validating the CAR and the LAR of a check based on the transaction amount authorized by the POS system 52, the payments engine 64 can first determine whether the CAR and the LAR of a check match (step 212). If the CAR and the LAR match, the payments engine 64 can validate the check without matching the CAR and the LAR to the authorized transaction amount (step 114). By eliminating the need to access and review the authorized transaction amount for every check, the payments engine 64 can process a check more quickly and can reduce the cost of operating the payments engine 64.

If, however, the payments engine 64 determines that the CAR and the LAR of a check do not match (or one or both are not legible) (step 212), the payments engine 64 can access the authorized transaction amount. If the authorized transaction amount associated with the check is available to the payments engine 64 (step 214) and if the payments engine 64 determines that the total of the checks being processed by the payments engine 64 reconciles with the expected total based on the authorized amounts associated with the checks (step 216), the payments engine 64 can assume that the authorized transaction amount associated with the check is correct. The payments engine 64 can then validate the check and use the authorized transaction amount as the amount of the check for processing (step 114).

If, however, the total of the checks processed by the payments engine 64 does not reconcile with the expected total based on the authorized amounts (step 216), the payments engine 64 can prompt the payment receiver to accept or decline the authorized transaction amount as the correct transaction amount (step 218). If the payment receiver accepts the authorized transaction amount as the correct amount (step 220), the payments engine 64 can use the authorized transaction amount as the amount of the check (step 222) and can validate the check (step 114). (If the authorized transaction amount is incorrect for some reason, the error can be caught during the deposit reconciliation performed after the check is processed, and can be corrected manually as described below.) Since typically the transaction amount authorized by the POS system 52 will be the correct amount, the payments engine 64 can reduce the number of checks that require manual review by allowing the payment receiver to accept the authorized transaction amount as the amount of a presented check. Reducing the number of checks that need manual review can also reduce the cost of processing a check and can decrease the amount of time needed to process a check.

In some embodiments, after deposits are made for a batch of checks, the payments engine 64 can determine if the total deposit amount calculated by the POS system 52 is the same as the actual total deposit amount. If the total deposit amount calculated by the POS system 52 has a lower dollar amount, the payments engine 64 can determine that a check was either declined but a POS device or device operator took the check anyway or that the transaction amount was entered incorrectly in the POS system 52. In either situation, the deposit does not need be corrected, but the payments engine 64 can alert the payment receiver of the situation. Alerting the payment receiver of that one or the two situations has occurred can assist a payment receiver in correcting internal records and identifying potential fraud or areas for employee improvement, counseling, or training.

Various features and advantages of the invention are set forth in the following claims.

The invention claimed is:

1. A method of validating a negotiable instrument, the method comprising:
    obtaining an electronic image of the negotiable instrument;
    electronically determining a first value and a second value of the negotiable instrument based on the electronic image;
    automatically validating the negotiable instrument when the first value is substantially equal to the second value; and
    when the first value is not substantially equal to the second value:
        determining whether an authorized transaction amount is available; and
        if the authorized transaction amount is available, automatically validating the negotiable instrument and using the authorized transaction amount as an amount of the negotiable instrument.

2. The method of claim 1 and further comprising automatically queuing the negotiable instrument for manual review if the authorized transaction amount associated with the negotiable instrument is not available.

3. The method of claim 1 and further comprising determining a total of a plurality of negotiable instruments, the plurality of negotiable instruments including the negotiable instrument.

4. The method of claim 3 and further comprising obtaining an expected amount of the plurality of negotiable instruments.

5. The method of claim 4 and further comprising automatically queuing the negotiable instrument for manual review if the total of the plurality of negotiable instruments is not substantially equal to the expected amount of the plurality of negotiable instruments.

6. The method of claim 1 wherein the negotiable instrument includes a check.

7. The method of claim 1 wherein the first value includes a courtesy amount received of the negotiable instrument and the second value includes a legal amount received of the negotiable instrument.

8. The method of claim 1 wherein the electronically determining a first value and a second value of the negotiable instrument based on the electronic image includes determining the first value and the second value of the negotiable instrument using optical character recognition.

* * * * *